US009546595B2

(12) United States Patent
Pamulaparthy (10) Patent No.: US 9,546,595 B2
(45) Date of Patent: Jan. 17, 2017

(54) COVER ASSEMBLY FOR AN ENGINE (71) Applicant: Electro-Motive Diesel, Inc., LaGrange, IL (US)

(72) Inventor: Abhinav R. Pamulaparthy, Aurora, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 80 days.

(21) Appl. No.: 14/488,352

(22) Filed: Sep. 17, 2014

(65) Prior Publication Data
US 2016/0076481 A1    Mar. 17, 2016

(51) Int. Cl.
*F02F 7/00* (2006.01)
*F02B 77/02* (2006.01)
*F16J 13/12* (2006.01)

(52) U.S. Cl.
CPC ............... *F02B 77/02* (2013.01); *F16J 13/12* (2013.01)

(58) Field of Classification Search
CPC ........ F02F 7/006; F02F 7/0053; F02F 7/0046; F02F 7/0031; F02F 7/0068; F02F 7/0073; F02F 7/0085; F02M 35/0203; F02M 13/04; F02M 2700/336; F02B 2063/045; F16M 5/00; F16B 39/24
USPC ............. 123/198 E, 195 R, 195 C; 292/340, 292/341.11–341.19, 256–257, 261, DIG. 11; D8/322, 346
See application file for complete search history.

(56) References Cited

U.S. PATENT DOCUMENTS

| 1,808,403 | A | * | 6/1931 | Eklund | F16J 13/08 220/243 |
| 2,997,038 | A | * | 8/1961 | Peters | F02B 77/10 123/198 E |
| 3,065,757 | A | * | 11/1962 | Peilet | A45D 2/02 132/313 |
| 3,361,465 | A | | 1/1968 | Dobbs | |
| 3,397,489 | A | * | 8/1968 | Cook | A61L 2/24 220/264 |
| 3,495,488 | A | * | 2/1970 | Pitts | G01N 1/04 30/130 |
| 3,521,613 | A | * | 7/1970 | Celli | F01L 1/047 123/195 R |
| 4,273,064 | A | * | 6/1981 | Sutton | B63B 19/14 114/203 |
| 6,752,119 | B2 | * | 6/2004 | Coleman | F01L 1/02 123/195 C |
| 7,004,636 | B2 | * | 2/2006 | Deschler | F16C 35/00 384/456 |
| 7,237,812 | B2 | * | 7/2007 | Tweedy | E05B 5/00 292/336.3 |

(Continued)

*Primary Examiner* — Long T Tran (57) ABSTRACT

A cover assembly is provided for an engine block having at least one sidewall defining a service opening therein. The cover assembly includes a plate defining an opening therein, a fastening element rotatably disposed in the opening, and a clamping element. The plate has a first side, and a second side. The second side is configured to seat against an outer surface of the sidewall. The fastening element has a first portion configured to be axially restricted by the plate, and a second portion axially extending from the first portion. The second portion is disposed beyond the second side. The clamping element includes a central core disposed at the second side. The central core defines a threaded receptacle configured to engage with the second portion. The clamping element also includes multiple arms that radial extend from the central core and seat against an inner surface of the sidewall.

21 Claims, 5 Drawing Sheets

(56) References Cited

U.S. PATENT DOCUMENTS

| | | | |
|---|---|---|---|
| 7,252,059 B2* | 8/2007 | Abbott | F01L 1/34 |
| | | | 123/195 C |
| 7,806,953 B2* | 10/2010 | Schlauch | B01D 46/24 |
| | | | 123/198 E |
| 2002/0111084 A1 | 8/2002 | Nemoto et al. | |
| 2005/0121282 A1* | 6/2005 | Fox | F16D 13/585 |
| | | | 192/70.19 |
| 2014/0130768 A1* | 5/2014 | Kramer | F02B 77/005 |
| | | | 123/198 E |

* cited by examiner

COVER ASSEMBLY FOR AN ENGINE

TECHNICAL FIELD

The present disclosure relates to a cover assembly, and more particularly, to a cover assembly for covering an opening defined in an engine.

BACKGROUND

Engines typically include various parts that are assembled to co-operatively move and generate power. In some cases, these parts may be located in tight spaces and/or at locations that are difficult to access.

Many systems have been developed in the past to facilitate and allow access to technicians and service personnel so that they may execute service routines or perform an overhaul, replacement, repair, or inspection of the parts. For reference, U.S. Pat. No. 3,361,465 (hereinafter referred to as '465 patent) relates to a device for closing a hand hole in an air box of a diesel engine. However, the device disclosed in the '465 patent includes many parts and hence, presents a construction that is complex besides entailing increased costs in developing the same.

Hence, there is a need to provide a simplified solution that overcomes the aforementioned shortcomings.

SUMMARY OF THE DISCLOSURE

In one aspect of the present disclosure, a cover assembly is provided for an engine block having at least one sidewall defining a service opening therein. The cover assembly includes a plate having a first side, a second side, and defining an opening therethrough. The second side is configured to seat against an outer surface of the sidewall. The cover assembly also includes a fastening element rotatably disposed in the opening of the plate. The fastening element has a first portion and a second portion. The first portion is configured to be axially restricted by the plate. The second portion axially extends from the first portion and is disposed beyond the second side of the plate.

The cover assembly further includes a clamping element that is disposed at the second side of the plate. The clamping element includes a central core defining a threaded receptacle therein. The threaded receptacle is configured to threadably engage with the second portion of the fastening element. The clamping element also includes a plurality of arms radially extending from the central core. Each of the arms defines an end that is configured to seat against an inner surface of the sidewall.

In another aspect of the present disclosure, embodiments disclosed herein are also directed to an engine having an engine block and employing the cover assembly to cover a service opening defined on a sidewall of the engine block.

Other features and aspects of this disclosure will be apparent from the following description and the accompanying drawings.

DETAILED DESCRIPTION

Figure 1:
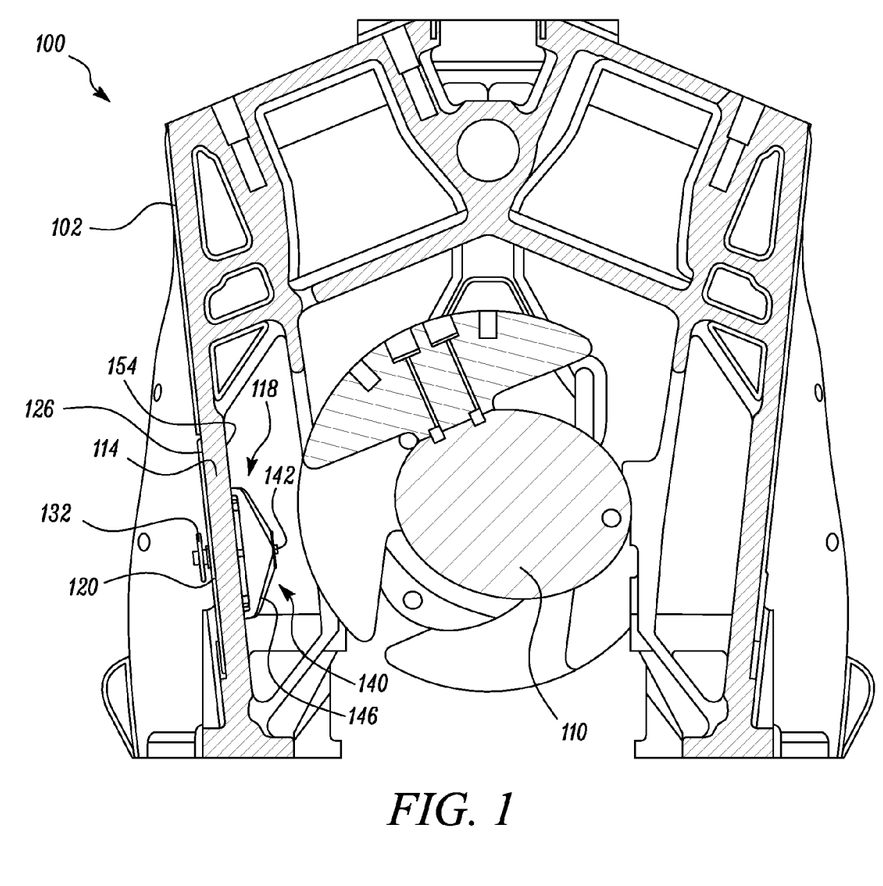
FIG. 1 is a side sectional view of an engine employing a cover assembly, in accordance with an embodiment of the present disclosure.

Wherever possible, the same reference numbers will be used throughout the drawings to refer to the same or like parts. FIG. 1 shows a side sectional view of an engine 100. As shown, the engine 100 is a multi-cylinder V-type engine. However, the engine 100 may also be a single cylinder engine. Alternatively, the engine 100 may be embodied to have an inline configuration, a radial configuration or other configurations known to one skilled in the art. Moreover, the engine 100 may be used in various applications such as, but not limited to, transportation, for e.g., in off-highway trucks, in earthmoving machines; or for power generation, for e.g., when coupled to a generator set, or to drive turbo-machines and/or other stationary equipment such as, for e.g., pumps, compressors and other devices commonly known in the art.

The engine 100 includes an engine block 102 defining one or more cylinders therein (not shown). The cylinders are configured to slidably receive pistons therein (not shown). As known in the art, each of these pistons may be provided with a connecting rod (not shown) whose one end is rotatably connected to the respective piston while the other end of the connecting rod is rotatably connected to a common crankshaft 110.

Figure 2:
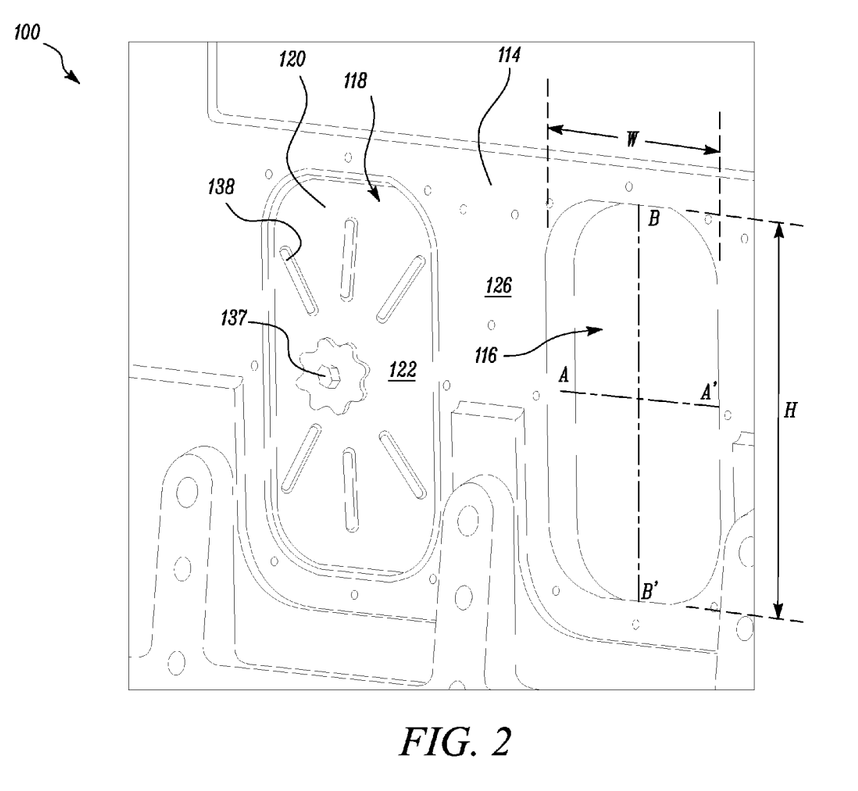
FIG. 2 is a front perspective view of the engine showing a pair of service openings, one of which is covered with the cover assembly and the other of which is left uncovered or open.

The engine block 102 includes one or more sidewalls 114. Referring to FIG. 2, one of the sidewalls 114 defines at least one service opening 116 therein (two service openings 116 shown in the illustrated embodiment of FIG. 2, one of which is covered and hence, not visible). As shown, the service opening 116 has a rectangular shape. Alternatively, the service opening 116 could have an oblong shape.

The service opening 116 defines a minor axis A-A' and a major axis B-B'. As shown, the minor axis A-A' is disposed along a smallest diameter of the service opening 116 while the major axis B-B' is disposed along the largest diameter of the service opening 116. Although, a rectangular shape and an oblong shape opening are disclosed herein, a person having ordinary skill in the art will acknowledge that various other shapes and sizes of openings can be optionally contemplated for the service opening 116 such that the service opening 116 defines a major axis B-B' and a minor axis A-A' thereof.

The present disclosure relates to a cover assembly 118 that is configured to releasably engage with the sidewall 114 of the engine block 102 so as to cover the service opening 116 defined thereon.

Figure 3:
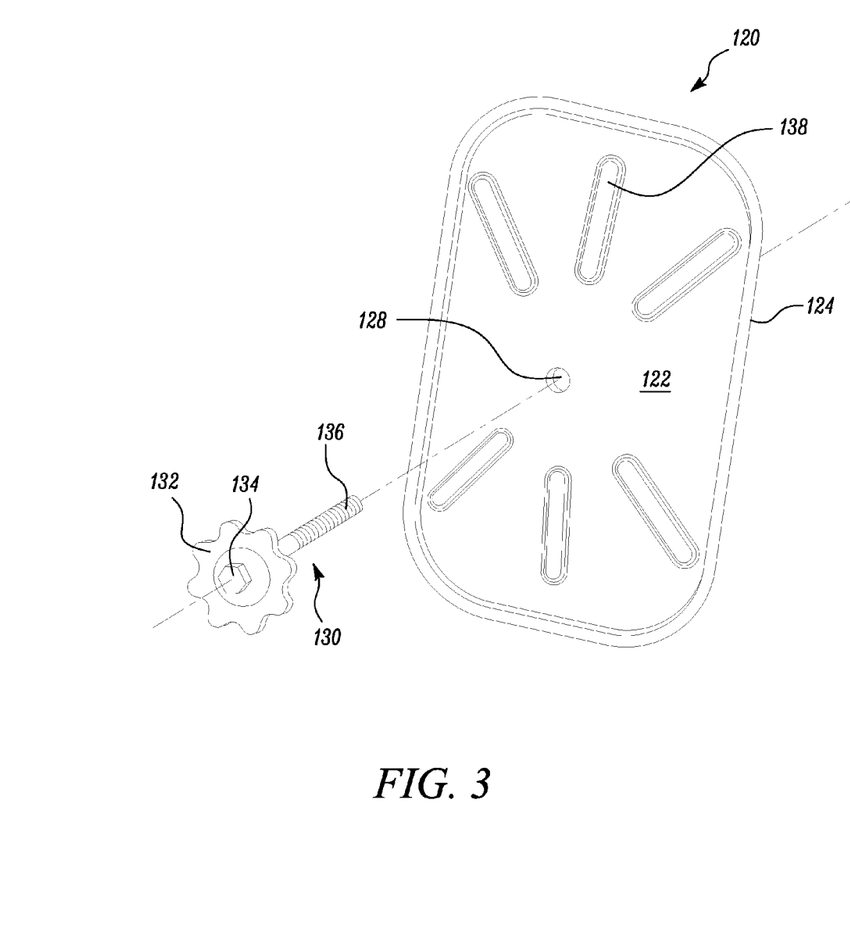
FIG. 3 is a front perspective view of the cover assembly.
Figure 4:
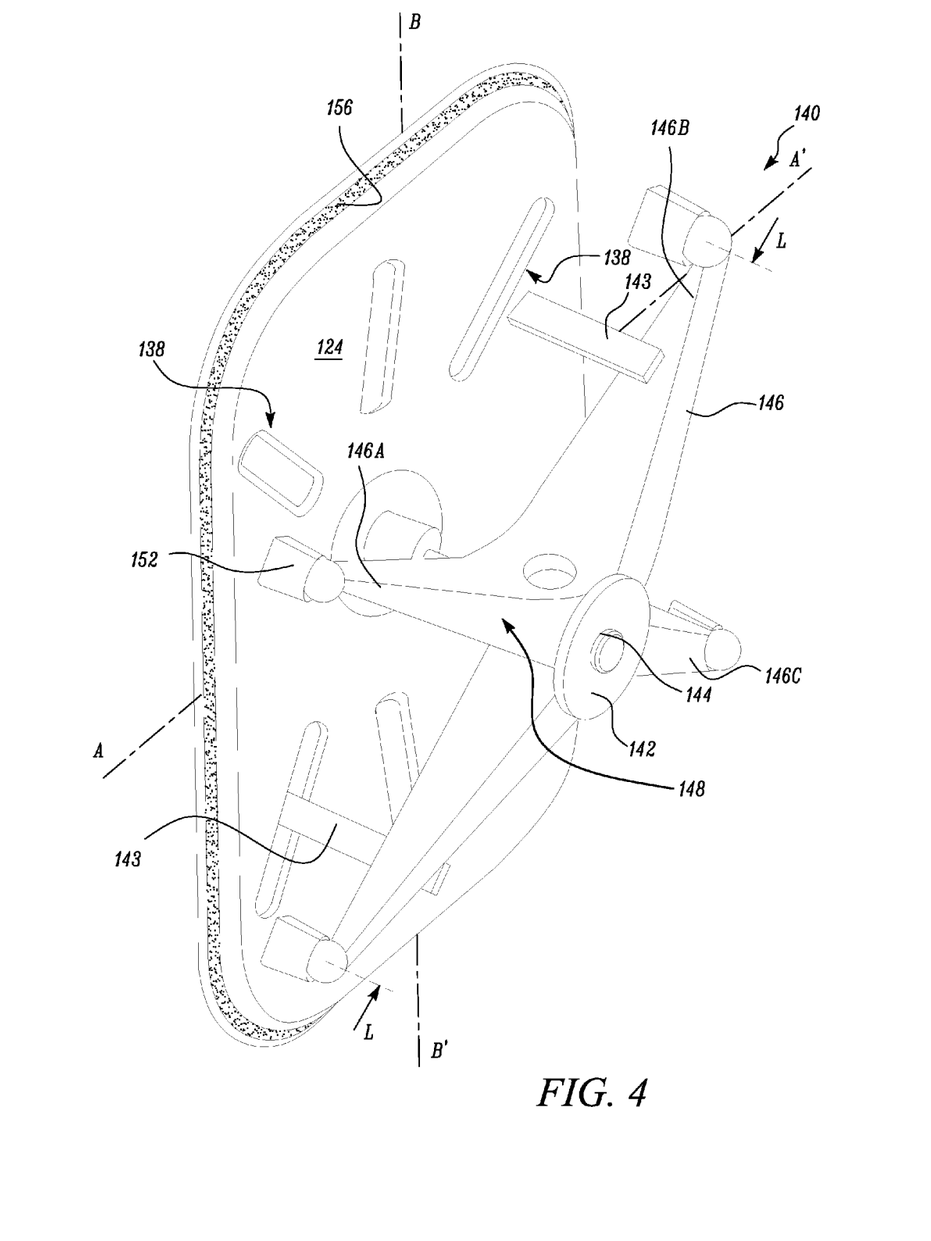
FIG. 4 is a rear perspective view of the cover assembly showing a clamping element.
Figure 5:
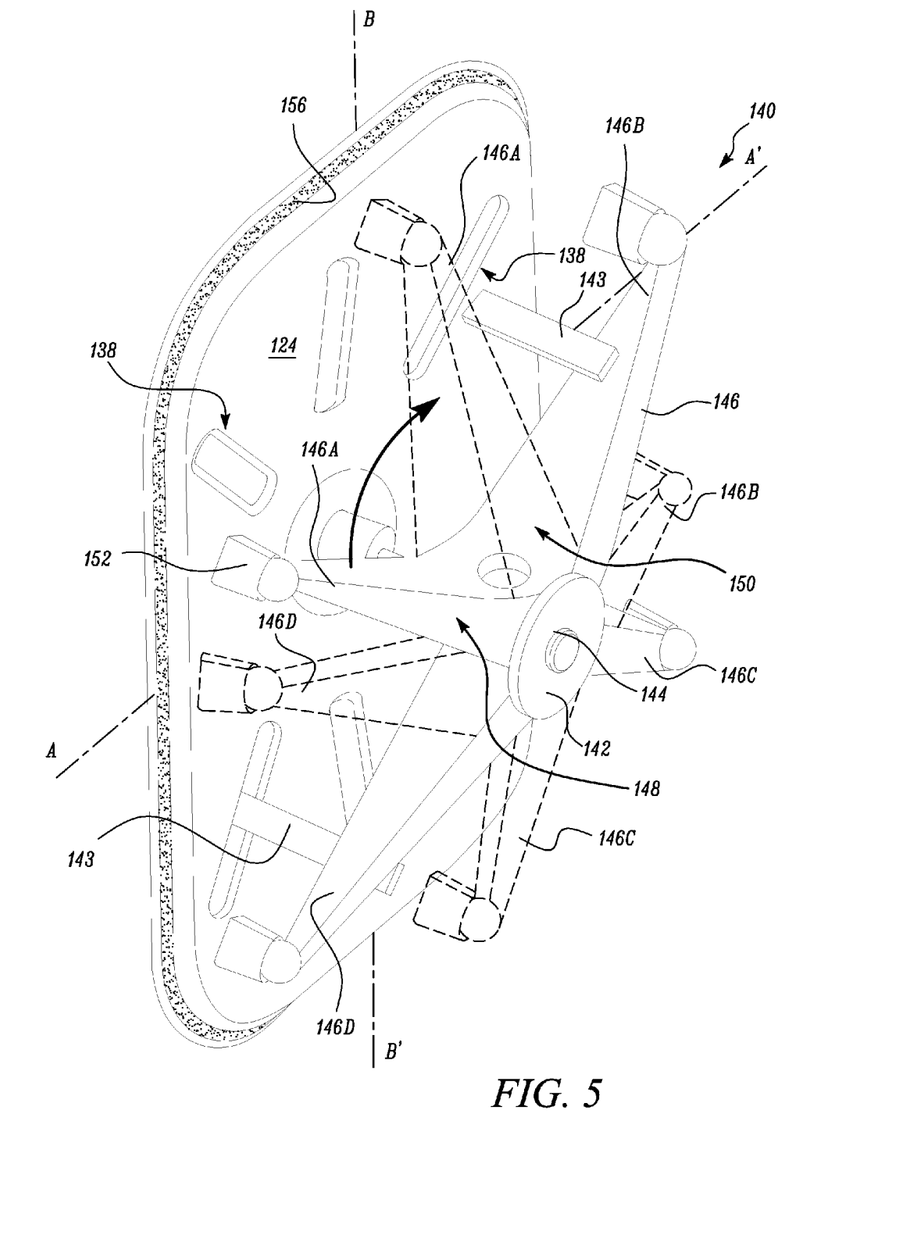
FIG. 5 is a rear perspective view of the cover assembly showing rotatable movement of arms.

Referring to FIGS. 1-5, the cover assembly 118 includes a plate 120 having a first side 122 and a second side 124 (See FIGS. 4 and 5). Upon installation of the cover assembly 118 on the sidewall 114 (See FIG. 2), the second side 124 seats against an outer surface 126 of the sidewall 114.

The plate 120 has a rectangular shape to correspond with the rectangular shape of the service opening 116. Alternatively, for a service opening 116 having an oblong shape, an oblong shaped plate 120 may be provided to correspond with the oblong shape of the service opening 116. Therefore, as shown, the dimensions and/or shape of the plate 120 and the service opening 116 may be mutually comparable in extent so as to allow the plate 120 to seat against the outer surface 126 of the sidewall 114 and also cover the service opening 116 defined thereon. }

The plate 120 defines an opening 128 therethrough. As shown, the opening 128 is centrally located on the plate 120. Optionally, it may be contemplated to locate the opening 128 away from a center of the plate 120. The opening 128 is configured to slidably receive a fastening element 130. The fastening element 130 is rotatably disposed in the opening 128.

The fastening element 130 includes a first portion 134 and a second portion 136. As shown, the fastening element 130 is embodied in the form of a bolt having a bolt head and a threaded shank in which the bolt head can be regarded as the first portion 134 and the threaded shank can be regarded as the second portion 136. Specifically, as shown, the threaded shank i.e., the second portion 136 is rotatably disposed in the opening 128. Moreover, the second portion 136 axially extends beyond the second side 124 of the plate 120. As such, relative diameters of the first portion 134 of the fastening element 130 and the opening 128 are selected such that the plate 120 is configured to restrict the passage of the first portion 134 through the opening 128.

Although a bolt is described herein, the fastening element 130 can be optionally embodied in other forms and types of fasteners commonly known to one skilled in the art such as, but not limited to, a lag screw, a grub screw, a helical screw, and a hanger bolt.

A second portion 136 of the fastening element 130 may axially extend from the first portion 134. The second portion 136 is further disposed beyond the second side 124 of the plate 120.

Optionally, a grip member 132 may be rigidly attached to the first portion 134. The grip member 132 may be used to rotate the fastening element 130. As shown in FIG. 3, the grip member 132 has arcuate grip portions radially arranged to give a floral appearance to the grip member 132. Alternatively, a handle or a knob may be disposed on or attached to the first portion 134 and/or the second portion 136 adjacent to the first portion 134 such that the grip member 132 may allow a technician to rotate the fastening element 130. Optionally, the technician can rotate the fastening element 130 by using a tool directly onto the first portion 134 of the fastening element 130. For example, the technician can engage a wrench onto the bolt head and rotate the fastening element 130 relative to the plate 120.

The cover assembly 118 includes a clamping element 140 disposed at the second side 124 of the plate 120. The clamping element 140 includes a central core 142 that defines a threaded receptacle 144 therein. The threaded receptacle 144 is configured to threadably engage with the second portion 136 of the fastening element 130.

As shown, the clamping element 140 includes multiple arms 146 radially extending from the central core 142 (four arms 146A, 146B, 146C, and 146D are shown in the illustrated embodiment of FIG. 4, hereinafter collectively referred to as arms 146). In the illustrated embodiment, the pair of arms 146A, 146D and 146B, 146C are disposed with an acute angle i.e., <90°, between them and the pair of arms 146A, 146B and 146C, 146D are disposed with an obtuse angle, i.e., >90°, between them. The clamping element 140 is rotatable between a series of first positions 148 and a series of second positions 150 relative to the minor axis A-A' (See FIGS. 4 and 5).

The clamping element 140 is configured to be axially restricted by the service opening 116 when the clamping element 140 is positioned in one of the positions of the series of first positions 148. The first positions 148 can include a series of positions of the clamping element 140 in which the minor axis A-A' of the service opening 116 lies in between one pair of adjacent arms 146A, 146D or 146C, 146B of the clamping element 140 that are disposed at an acute angle to each other. Similarly, the second position 150 can include a series of positions that is exclusive of the series of positions included in the first position 148 of the clamping element 140. The clamping element 140 is configured to pass through the service opening 116 when the clamping element 140 is positioned in one of the positions of the series of second positions 150.

Therefore, when the clamping element 140 is in the first position 148, the arms 146 of the clamping element 140 can be axially restricted by the sidewall 114 of the engine block 102. However, when the clamping element 140 is in the second position 150, the arms 146 of the clamping element 140 can pass through the service opening 116 of the engine block 102.

As such, a combined length 'L' of the opposing arms 146A, 146C or 146B, 146D is greater than a width 'W' of the service opening 116 measured along the minor axis A-A', and the combined length 'L' is also less than the height 'H' of the service opening 116 measured along the major axis B-B'. Thus, the arms 146A, 146B, 146C, 146D are restricted against the sidewall 114 as the arms 146A, 146C or 146B, 146D tend to align with the minor axis A-A'. Hence, the clamping element 140 can pass through the service opening 116 only when the pair of arms 146A, 146C or 146B, 146D tend to substantially align with the major axis B-B'.

Although four arms 146 are shown symmetrically disposed about the central core 142, optionally, it can be contemplated to beneficially provide the clamping element 140 with just a pair of arms 146 opposing each other and disposed at a mutually included angle of 180 degrees. A person having ordinary skill in the art will acknowledge that the number of arms, a length of each arm, and the arrangement of arms about the central core can vary from one application to another depending on specific requirements of an application. Therefore, it should be noted that the number, size, and/or arrangement depicted in the illustrated embodiments of FIGS. 1-5 are merely exemplary in nature and hence, non-limiting of this disclosure.

The plate 120 further includes stop members 143 that are extending from the second side 124 of the plate 120. In the illustrated embodiment, two stop members 143 are shown attached to the second side 124 and are extending substantially perpendicular to the second side 124. However, it may be contemplated to include any number of stop members 143 that may or may not be extending perpendicularly from the second side 124 of the plate 120. In one embodiment, the stop members 143 may be integrally formed with the plate 120 such that the plate 120 and the stop members 143 present a unitary construction thereof.

Optionally, the stop members 143 may be separate from the plate 120 and may be attached to the plate 120 by commonly known methods such as, but not limited to, welding, soldering, and/or brazing.

The stop members 143 are configured to locate and restrict rotational movement of the opposing arms 146B, 146D or 146A, 146C. One of ordinary skill in the art will acknowledge that as the fastening element 130 is rotated, the clamping element 140 may have a possibility of rotating together with the fastening element 130. Therefore, during installation, the clamping element 140 may initially be adjusted by hand such that upon further rotation of the fastening element 130, the clamping element 140 is only drawn closer to the second side 124 of the plate 120.

After certain amount of rotation of the fastening element 130 and/or the clamping element 140, the stop members 143 may engage with at least one of the arms 146A, 146B, 146C, 146D. Thereafter, the clamping element 140 is rotationally restricted by the stop members 143. At this point, the clamping element 140 is only capable of being axially drawn closer to the second side 124 of the plate 120.

As the clamping element 140 is moved towards the inner surface 154, the ends 152 of the arms 146 abut the inner surface 154 of the sidewall 114. Moreover, it is hereby contemplated that when the clamping element 140 is restricted by the stop members 143, the ends 152 of the arms 146 may be urged against the inner surface 154 of the sidewall 114 thus exerting a compressive force on the sidewall 114.

Moreover, the plate 120 additionally defines multiple recessed portions 138 on the second side 124. The recessed portions 138 may act as stiffening members and may help the plate 120 to resist forces encountered during fastening of the clamping element 140 or other operations.

As shown in FIG. 4, a sealing member 156 may be disposed along a perimeter of the second side 124 of the plate 120. The sealing member 156 may be, but not limited to, an O-ring seal, a gasket, and other like structures commonly known to one skilled in the art. The sealing member 156 is provided to help prevent fluids, typically associated with engine block 102, from leaking out of the cover assembly 118. Moreover, the sealing member 156 may also be beneficially configured to prevent fluid/s from entering the engine block 102 and/or contaminating the fluid/s associated with the engine block 102.

For clarity in understanding the present disclosure, a manner of using the cover assembly 118 will be explained hereinafter.

In order to cover the service opening 116, the technician may first rotate the arms 146 of the clamping element 140 to the second position 150 such that the arms 146 are capable of passing through the service opening 116. Then the cover assembly 118 is positioned such that the second side 124 of the plate 120 faces the outer surface 126 of the sidewall 114. Thereafter, the clamping element 140 is rotated such that the ends 152 of the arms 146 face the inner surface 154 of the sidewall 114.

Further, the arms 146 are positioned by rotating the fastening element 130 and/or the clamping element 140, such that the stop members 143 engages with at least one of the arms 146A, 146B, 146C, 146D. Accordingly, further rotational movement of the clamping element 140 is restricted by the stop members 143. Thereafter, as the fastening element 130 is rotated, the clamping element 140 is axially drawn closer to the second side 124 of the plate 120. As the clamping element 140 is moved towards the second side 124 of the plate 120, the ends 152 of the arms 146 seat against the inner surface 154 of the sidewall 114.

INDUSTRIAL APPLICABILITY

The present cover assembly 118 has applicability for implementation and use in covering an opening commonly encountered in various types of industrial applications. Although, embodiments of the present disclosure are explained in conjunction with the engine 100, the cover assembly 118 can beneficially be used to cover an opening in various structures such as box-type enclosures, housings, casings and the like.

With use of the cover assembly 118 disclosed herein, service technicians can prevent ingress of dirt, dust, debris, and other foreign particles into the confined spaces of the engine block 102. Moreover, the cover assembly 118 may allow service technicians to quickly and conveniently cover or uncover the service opening 116.

The cover assembly 118 of the present disclosure also uses fewer parts than conventionally known covers thereby allowing manufacturers and users of the present cover assembly 118 to mitigate or offset costs that were previously incurred. Moreover, in some cases, the conventionally known covers involved a plate that was fastened to the sidewall using multiple screws or bolts fasteners. These fasteners were separable from the plate and hence, prone to being lost after removal of the plate. However, with implementation of the cover assembly 118 of the present disclosure, all parts of the cover assembly 118 can stay together thereby reducing the possibility of fasteners getting lost.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A cover assembly for an engine block having at least one sidewall defining a service opening therein, the cover assembly comprising:
    a plate having a first side and a second side, the second side configured to seat against an outer surface of the at least one sidewall, the plate defining an opening therethrough;
    a fastening element rotatably disposed in the opening of the plate, the fastening element having a first portion configured to be axially restricted by the plate, and a second portion axially extending from the first portion and disposed beyond the second side of the plate; and
    a clamping element disposed at the second side of the plate and rotatable between a series of positions, the clamping element comprising:
        a central core defining a threaded receptacle therein, the threaded receptacle configured to threadably engage with the second portion of the fastening element; and
        a plurality of arms radially extending from the central core, each of the plurality of arms defining an end that is configured to seat against an inner surface of the sidewall, the plurality of arms include one or more sets of adjacent arms having acute angle between them,
        wherein the clamping element passes through the service opening at positions of the clamping element when a minor axis of the service opening does not lie between the one or more sets of adjacent arms having acute angle between them.

2. The cover assembly of claim 1, wherein the opening is centrally located on the plate.

3. The cover assembly of claim 1, wherein rotation of the fastening element relative to the threaded receptacle causes movement between the plate and the clamping element.

4. The cover assembly of claim 1, wherein a length of at least one pair of opposing arms from the plurality of arms is greater than the minor axis of the service opening.

5. The cover assembly of claim 4, wherein the clamping element is rotatable through a series of first positions and a series of second positions relative to the minor axis of the service opening.

6. The cover assembly of claim 5, wherein the clamping element is configured to be axially restricted by the service opening when the clamping element is positioned in the series of first positions.

7. The cover assembly of claim 5, wherein the clamping element is configured to pass through the service opening when the clamping element is positioned in the series of second positions.

8. The cover assembly of claim 1 further including a grip member rigidly attached to the first portion of the fastening element.

9. The cover assembly of claim 1 wherein the plate includes a plurality of recessed portions disposed thereon.

10. The cover assembly of claim 9 further comprising a stop member extending from the second side of the plate, wherein the stop member is configured to engage with one of the arms upon rotation of the clamping element relative to the fastening element.

11. The cover assembly of claim 1, wherein a shape of the plate is one of rectangular and oblong.

12. An engine block including:
at least one sidewall defining one of a rectangular and an oblong shaped service opening, and
employing the cover assembly of claim 11.

13. An engine comprising:
an engine block having at least one sidewall defining a service opening therein;
a cover assembly for releasably engaging with the sidewall to cover the service opening, the cover assembly comprising:
a plate having a first side and a second side, the second side configured to seat against an outer surface of the sidewall, the plate defining an opening therethrough;
a fastening element rotatably disposed within the opening of the plate, the fastening element having a first portion configured to be axially restricted by the plate, and a second portion axially extending from the first portion and disposed beyond the second side of the plate; and
a clamping element disposed at the second side of the plate and rotatable between a series of positions, the clamping element comprising:
a central core defining a threaded receptacle therein, the threaded receptacle configured to threadably engage with the second portion of the fastening element; and
a plurality of arms radially extending from the central core, each of the plurality of arms defining an end that is configured to seat against an inner surface of the sidewall, the plurality of arms include one or more sets of adjacent arms having acute angle between them,
wherein the clamping element passes through the service opening at positions of the clamping element when a minor axis of the service opening does not lie between the one or more sets of adjacent arms having acute angle between them.

14. The engine of claim 13, wherein a shape of the service opening is one of rectangular and oblong.

15. The engine of claim 13, wherein a shape of the plate is one of rectangular and oblong.

16. The engine of claim 13, wherein rotation of the fastening element to the threaded receptacle causes relative movement between the plate and the clamping element.

17. The engine of claim 13, wherein a length of at least one pair of opposing arms from the plurality of arms is greater than the minor axis of the service opening.

18. The engine of claim 17, wherein the clamping element is rotatable through a series of first positions and a series of second positions relative to the minor axis of the service opening.

19. The engine of claim 18, wherein the clamping element is configured to be axially restricted by the service opening when the clamping element is positioned in the series of first positions.

20. The engine of claim 18, wherein the clamping element is configured to pass through the service opening when the clamping element is positioned in the series of second positions.

21. The engine of claim 13 further including a sealing member disposed along a perimeter of the second side of the plate.

* * * * *